(12) United States Patent
Hefner et al.

(10) Patent No.: US 10,875,626 B2
(45) Date of Patent: Dec. 29, 2020

(54) FOLDABLE WINGS FOR UAS HAVING A GEARED INTERFACE

(71) Applicant: Textron Innovations Inc., Providence, RI (US)

(72) Inventors: Levi Charles Hefner, Wichita, KS (US); Dakota Charles Easley, Dallas, TX (US); Danielle Lynn Moore, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 340 days.

(21) Appl. No.: 16/148,005

(22) Filed: Oct. 1, 2018

(65) Prior Publication Data

US 2019/0031316 A1    Jan. 31, 2019

Related U.S. Application Data

(63) Continuation-in-part of application No. 15/620,310, filed on Jun. 12, 2017, now Pat. No. 10,717,526.

(51) Int. Cl.
| | |
|---|---|
| *B64C 3/56* | (2006.01) |
| *B64C 11/48* | (2006.01) |
| *B64C 29/02* | (2006.01) |
| *B64C 39/02* | (2006.01) |
| *B64C 39/00* | (2006.01) |
| *F16H 1/06* | (2006.01) |

(52) U.S. Cl.
CPC ............... *B64C 3/56* (2013.01); *B64C 11/48* (2013.01); *B64C 29/02* (2013.01); *B64C 39/006* (2013.01); *B64C 39/024* (2013.01); *B64C 2201/021* (2013.01); *B64C 2201/042* (2013.01); *B64C 2201/088* (2013.01); *B64C 2201/102* (2013.01); *B64C 2201/108* (2013.01); *B64C 2201/146* (2013.01); *B64C 2201/165* (2013.01); *F16H 1/06* (2013.01)

(58) Field of Classification Search
CPC ........... B64C 3/56; B64C 11/48; B64C 29/02; B64C 39/006; B64C 39/024; B64C 2201/021; B64C 2201/042; B64C 2201/088; B64C 2201/102; B64C 2201/108; B64C 2201/146; B64C 2201/165; F16H 1/06

See application file for complete search history.

(56) References Cited

U.S. PATENT DOCUMENTS 1,890,354 A * 12/1932 Armour .................... B64C 3/56
                                                        244/49
3,194,514 A    7/1965 Rogallo
(Continued)

*Primary Examiner* — Rodney A Bonnette
(74) *Attorney, Agent, or Firm* — Lawrence Youst PLLC

(57) ABSTRACT

A foldable wing system for an unmanned aerial system having a fuselage includes a left wing frame having an inboard gear rotatably coupled to the fuselage, a right wing frame having an inboard gear rotatably coupled to the fuselage and a wing actuator coupled to a linkage point on at least one of the wing frames. The wing frames are movable between a plurality of positions including a deployed position and a stowed position. The inboard gear of the left wing frame is engaged with the inboard gear of the right wing frame such that the wing frames move symmetrically between the plurality of positions in response to movement of the linkage point by the wing actuator.

19 Claims, 9 Drawing Sheets

(56) References Cited

U.S. PATENT DOCUMENTS

| | | | | |
|---|---|---|---|---|
| 9,545,991 B1* | 1/2017 | Alley | ......................... | B64C 3/40 |
| 2017/0197702 A1* | 7/2017 | Alley | ...................... | B64C 11/28 |
| 2017/0283035 A1* | 10/2017 | Ji | ............................ | B64C 27/26 |
| 2017/0336184 A1* | 11/2017 | Merems | .................. | F42B 10/14 |
| 2018/0354612 A1* | 12/2018 | Hefner | ................... | B64C 29/02 |
| 2020/0324874 A1* | 10/2020 | Zhang | ...................... | B64C 3/56 |

* cited by examiner

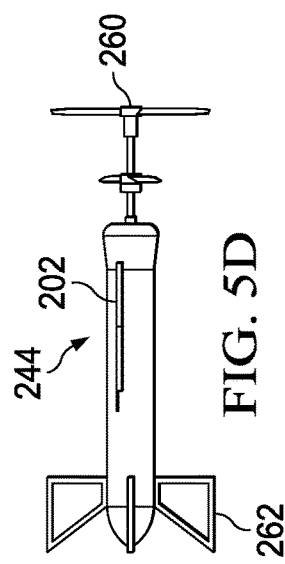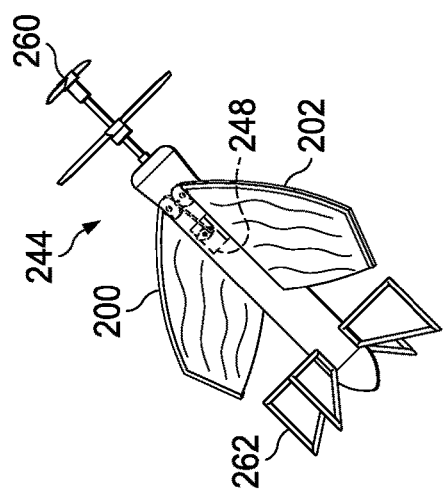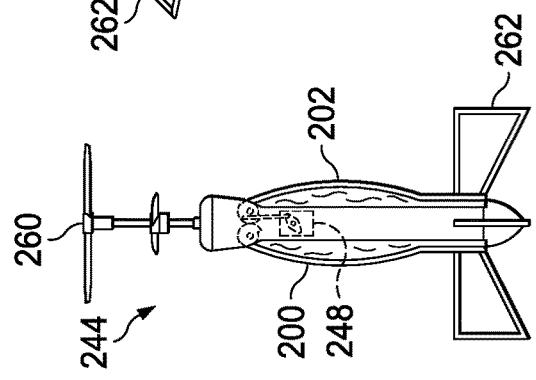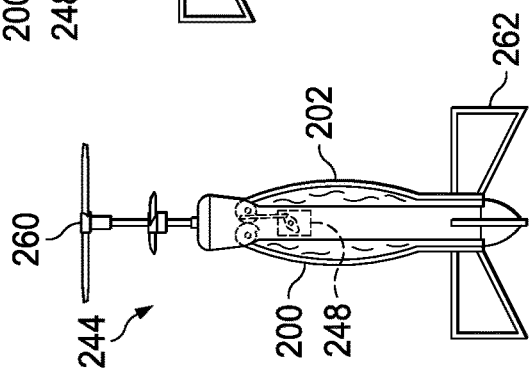

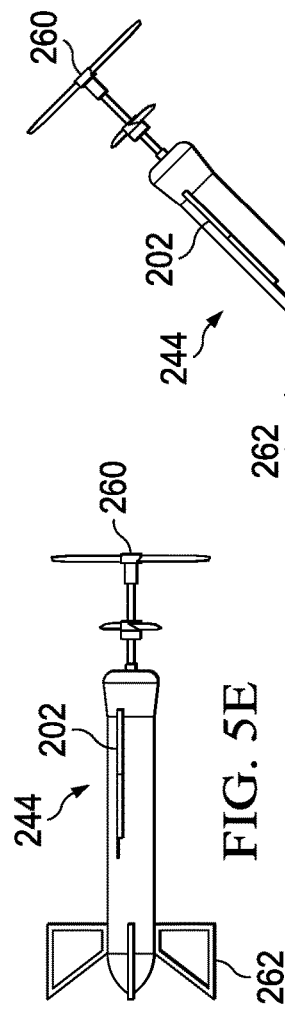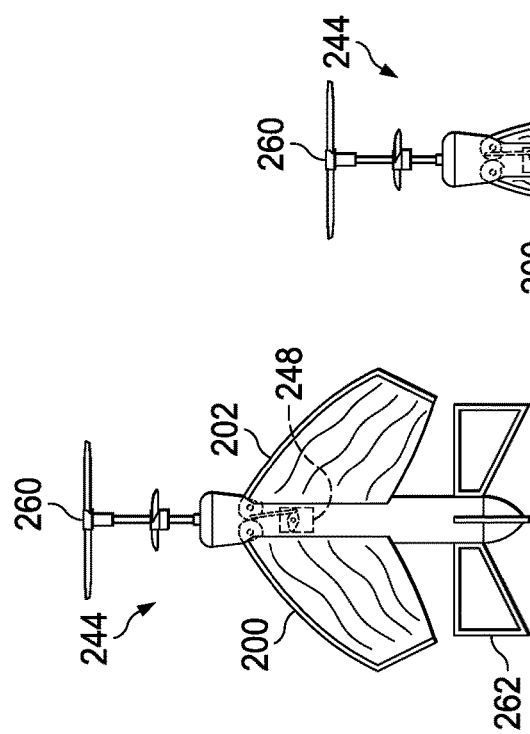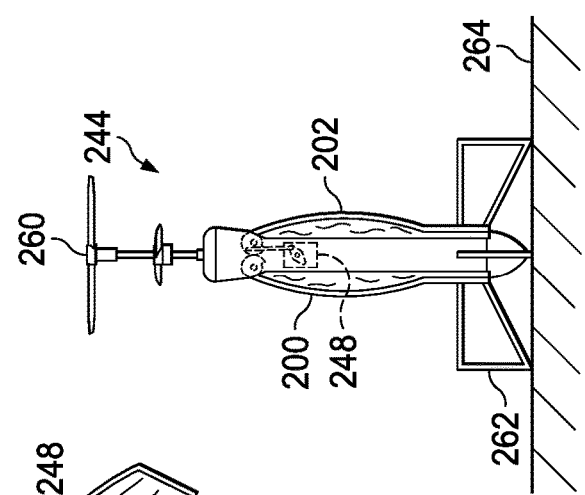

FOLDABLE WINGS FOR UAS HAVING A GEARED INTERFACE

CROSS-REFERENCE TO RELATED APPLICATIONS

This is a continuation-in-part of co-pending application Ser. No. 15/620,310 filed Jun. 12, 2017, the entire contents of which is hereby incorporated by reference.

TECHNICAL FIELD OF THE DISCLOSURE

The present disclosure relates, in general, to rotorcraft having foldable wings and, in particular, to unmanned aerial systems including foldable wings having a geared interface to allow for symmetric deployment of the foldable wings.

BACKGROUND

Fixed-wing aircraft, such as airplanes, are capable of flight using wings that generate lift responsive to the forward airspeed of the aircraft, which is generated by forward thrust from one or more jet engines or propellers. The wings have an airfoil cross section that generate lift to support the airplane in flight. Unlike fixed-wing aircraft, vertical takeoff and landing (VTOL) aircraft are capable of taking off, hovering and landing vertically. One example of VTOL aircraft is a helicopter that utilizes a main rotor to enable hovering, vertical takeoff and vertical landing, as well as forward, aftward and lateral flight.

Certain unmanned aerial systems (UAS) have been configured as fixed-wing aircraft while other unmanned aerial systems have been configured as helicopters, quadcopters or other types of VTOL aircraft. Even though attempts have been made toward developing unmanned aerial systems that combine the vertical lift capability of a VTOL aircraft with the speed and range of fixed-wing aircraft, it has been found that scaling such unmanned aerial systems down to micro or personal-sized unmanned aerial systems is difficult. As such, current fixed-wing and VTOL unmanned aerial systems may be unsuitably structured for compact or pocket-sized storage when not in use or while being transported or carried by military personnel. For example, fixed-wing unmanned aerial systems require a wingspan sufficient to generate lift during forward flight, thereby increasing the storage footprint of the unmanned aerial system. Accordingly, a need has arisen for an unmanned aerial system with the adaptability to operate as either a winged aircraft or a VTOL aircraft while having a compact configuration for certain flight modes and/or while not in use.

SUMMARY

In a first aspect, the present disclosure is directed to a foldable wing system for an unmanned aerial system including a fuselage, the foldable wing system including a left wing frame having an inboard gear rotatably coupled to the fuselage, a right wing frame having an inboard gear rotatably coupled to the fuselage and a wing actuator coupled to a linkage point on at least one of the wing frames. The wing frames are movable between a plurality of positions including a deployed position and a stowed position. The inboard gear of the left wing frame is engaged with the inboard gear of the right wing frame such that the wing frames move symmetrically between the plurality of positions in response to movement of the linkage point by the wing actuator.

In some embodiments, the inboard gears may be formed at the inboard ends of the wing frames. In certain embodiments, the inboard gears may be meshed such that rotation of one of the left wing frame or the right wing frame causes rotation in the other of the left wing frame or the right wing frame. In some embodiments, the wing frames may each include a root arm and an extension arm. In certain embodiments, the extension arm may form an obtuse inner angle with the root arm. In some embodiments, the extension arm may be pivotable relative to the root arm. In certain embodiments, the foldable wing system may include a left wing skin coupled to the left wing frame to form a left wing and a right wing skin coupled to the right wing frame to form a right wing. In some embodiments, the foldable wing system may include left and right wing pivot posts coupled to the fuselage, and the inboard gears may each be rotatably coupled to a respective one of the wing pivot posts to form a revolute joint. In certain embodiments, the inboard gears may each be a partial gear having teeth disposed around a partial circumference of the inboard gear.

In some embodiments, the wing actuator may be a servo disposed in the fuselage. In certain embodiments, the linkage point may be located on one of the inboard gears and the wing frames may move between the plurality of positions in response to the wing actuator rotating the linkage point. In some embodiments, the wing frames may transition to the stowed position in response to one of a clockwise or a counter clockwise rotation of the linkage point by the wing actuator and the wing frames may transition to the deployed position in response to the other of the clockwise or the counter clockwise rotation of the linkage point by the wing actuator. In certain embodiments, the linkage point may be a linkage ball disposed on one of the inboard gears. In some embodiments, the foldable wing system may include a linkage coupling the wing actuator to the linkage point. In certain embodiments, the wing frames may move into the stowed position in response to the wing actuator moving the linkage forward and the deployed position in response to the wing actuator moving the linkage aft.

In a second aspect, the present disclosure is directed to a rotorcraft including a fuselage, a left wing frame having an inboard gear rotatably coupled to the fuselage, a right wing frame having an inboard gear rotatably coupled to the fuselage and a wing actuator coupled to a linkage point on at least one of the wing frames. The wing frames are movable between a plurality of positions including a deployed position and a stowed position. The inboard gear of the left wing frame is engaged with the inboard gear of the right wing frame such that the wing frames move symmetrically between the plurality of positions in response to movement of the linkage point by the wing actuator.

In some embodiments, the inboard gears may be disposed inside the fuselage. In certain embodiments, the inboard gears may each include a geared portion and a smooth portion, and the wing frames may each include a root arm protruding from the smooth portions of the inboard gears. In some embodiments, the inboard gears may mesh at a longitudinal centerline of the rotorcraft. In certain embodiments, the rotorcraft may be operable to transition between a vertical takeoff and landing flight mode and a forward flight mode, and the fuselage may have a substantially vertical orientation in the vertical takeoff and landing flight mode and a substantially horizontal orientation in the forward flight mode. In some embodiments, the wing frames may be in the deployed position in the forward flight mode. In certain embodiments, the wing frames may transition between the stowed position and the deployed position in response to transitioning between the vertical takeoff and landing flight mode and the forward flight mode. In some embodiments, the wing frames may be positionable into the stowed position in the vertical takeoff and landing flight mode. In certain embodiments, the rotorcraft may be operable in a storage mode and the wing frames may be in the stowed position in the storage mode.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 5A-5H are schematic illustrations of an unmanned aerial system in a sequential takeoff, flight and landing operation scenario in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
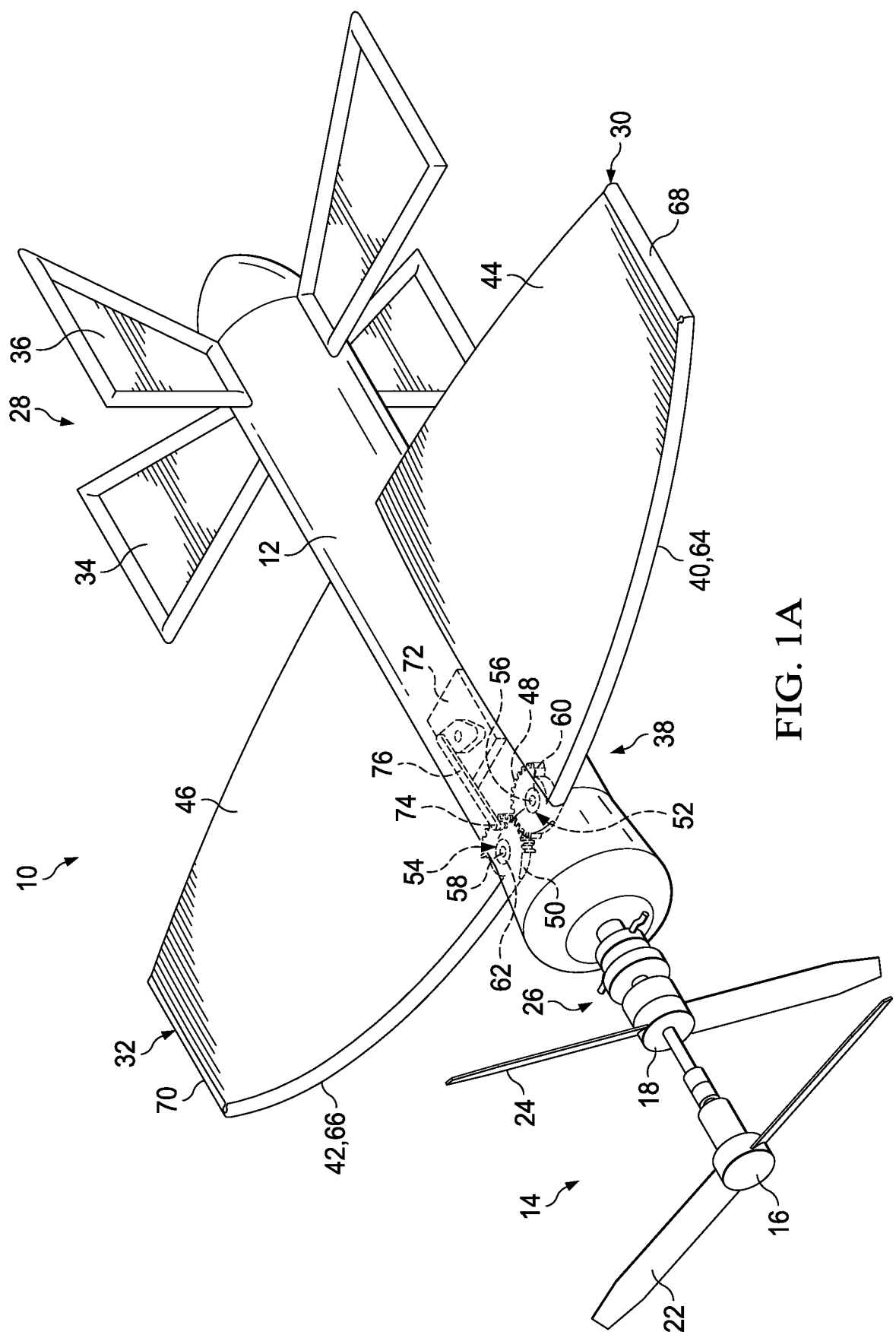
FIGS. 1A-1B are schematic illustrations of an unmanned aerial system having a foldable wing system in accordance with embodiments of the present disclosure.
Figure 1B:
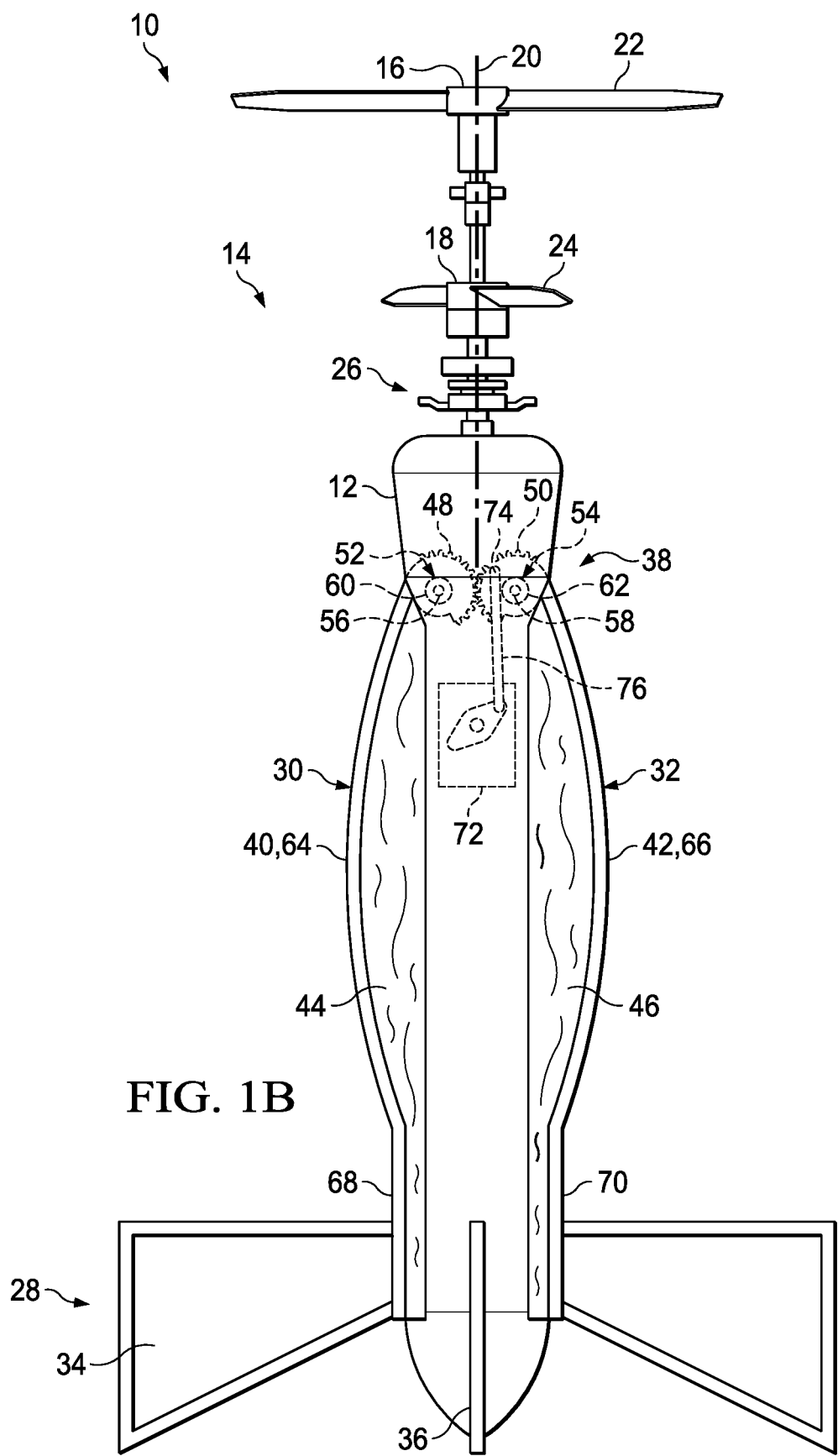

Referring to FIGS. 1A-1B in the drawings, an unmanned aerial system is schematically illustrated and generally designated 10. Unmanned aerial system 10 includes an elongated fuselage 12. Fuselage 12 is generally cylindrical and has a circular cross-section, although in other embodiments fuselage 12 may form other shapes and have a polygonal, elliptical, irregular or other cross-sectional shape. A propulsion assembly 14 disposed at the forward end of fuselage 12 includes a coaxial dual rotor system. In particular, propulsion assembly 14 includes forward and aft rotors 16, 18. In the illustrated embodiment, each of forward and aft rotors 16, 18 is driven by an independent motor. In other embodiments, forward and aft rotors 16, 18 may be driven by a single motor. Rotors 16, 18 are rotatable relative to fuselage 12 about a central longitudinal axis 20. Rotors 16, 18 counter rotate to prevent undesirable moments on unmanned aerial system 10 without the use of a tail rotor or other anti-torque system and/or device. Forward and aft rotors 16, 18 each include two rotor blades 22, 24, respectively, although in other embodiments forward and aft rotors 16, 18 could alternatively have a different number of rotor blades. Rotor blades 22 are illustrated as having the same length as rotor blades 24, although in other embodiments rotor blades 22 may have a different length than rotor blades 24. Rotor blades 22, 24 may be fixed or variable pitch rotor blades, and may be operably connected to a swashplate 26 to enable collective and/or cyclic control. Forward and aft rotors 16, 18 are variable speed rotors. The torque and revolutions per minute (RPM) of forward rotor 16 is independently controllable from the torque and RPM of aft rotor 18, thereby allowing rotors 16, 18 to have the same or different torque, RPM or resulting thrust. For example, forward rotor 16 may spin faster than aft rotor 18 and therefore produce more torque than aft rotor 18 resulting in a roll moment being exerted on unmanned aerial system 10. Unmanned aerial system 10 also includes a tail assembly 28 having control surfaces operable for horizontal and/or vertical stabilization during flight.

FIG. 1A illustrates unmanned aerial system 10 in a forward flight mode, in which rotors 16, 18 are positioned to rotate in a substantially vertical plane to provide a generally forward thrust while a lifting force is supplied by left and right wings 30, 32 such that unmanned aerial system 10 flies much like a conventional propeller driven aircraft. Fuselage 12 has a horizontal orientation in forward flight mode. When unmanned aerial system 10 is in forward flight mode, changes in the relative speeds of rotors 16, 18 may produce changes in the roll positioning of unmanned aerial system 10. FIG. 1B illustrates unmanned aerial system 10 in a vertical takeoff and landing (VTOL) flight mode, in which rotors 16, 18 are positioned to rotate in a generally horizontal plane to provide a lifting thrust such that unmanned aerial system 10 flies much like a conventional helicopter. Fuselage 12 has a vertical orientation in VTOL flight mode. When unmanned aerial system 10 is in VTOL flight mode, changes in the relative speeds of rotors 16, 18 may produce changes in the yaw positioning of unmanned aerial system 10. Unmanned aerial system 10 may be selectively operated in forward flight mode, VTOL flight mode and transition modes therebetween during which unmanned aerial system 10 may selectively switch between forward flight mode and VTOL flight mode during flight. Unmanned aerial system 10 may selectively remain in a transition flight mode for a period of time longer than necessary to switch between forward flight mode and VTOL flight mode. While the illustrated embodiment of unmanned aerial system 10 may transition between forward flight mode in FIG. 1A and VTOL flight mode in FIG. 1B, in other embodiments, unmanned aerial system 10 may be operable in only one or the other flight mode.

Tail assembly 28 includes tailerons 34 and rudders 36. In some embodiments, tailerons 34 move independently of one another for roll and pitch control and rudders 36 move together for yaw control while unmanned aerial system 10 is in forward flight mode. Tailerons 34 and rudders 36 may also operate as landing gear when unmanned aerial system 10 is in VTOL flight mode. In some embodiments, fuselage 12 may include two actuators or servos that each independently rotate a respective taileron 34 and one actuator or servo to rotate both rudders 36. Either or both rotors 16, 18 may be tilted using swashplate 26 for vectoring the thrust produced by rotors 16, 18. For example, rotor 18 may be selectively tilted to provide a desired thrust vector that is not parallel to central longitudinal axis 20. When unmanned aerial system 10 is in VTOL flight mode, such thrust vectoring may be used to move unmanned aerial system 10 in lateral directions and/or overcome wind or wind gusts that may otherwise undesirably move unmanned aerial system 10. When unmanned aerial system 10 is in forward flight mode, rotor 18 may be tilted to turn unmanned aerial system 10 or change the altitude of unmanned aerial system 10. In some embodiments, swashplate 26 may utilize two actuators or servos to tilt either or both rotors 16, 18. Fuselage 12 houses a power system, such as a battery, to provide power to the motors, actuators, servos and other systems and components of unmanned aerial system 10. Unmanned aerial system 10 may be any size or weight based on many factors, such as desired payload or intended functionality.

Unmanned aerial system 10 utilizes a foldable wing system 38 including wings 30, 32. Left and right wings 30, 32 include left and right wing frames 40, 42 coupled to left and right wing skins 44, 46, respectively. The inboard ends of wing frames 40, 42 form inboard gears 48, 50 rotatably coupled to fuselage 12 at revolute joints 52, 54, respectively. Revolute joints 52, 54 each include a pivot post 56, 58 coupled to fuselage 12 about which wing frames 40, 42 are rotatably coupled. Revolute joints 52, 54 may also each include a bearing 60, 62 to facilitate rotation of wing frames 40, 42 about pivot posts 56, 58. Inboard gears 48, 50 are each disposed inside fuselage 12. The teeth of inboard gears 48, 50 mesh at or near longitudinal centerline 20 of unmanned aerial system 10. Wing frames 40, 42 each include a respective root arm 64, 66 and extension arm 68, 70. Extension arms 68, 70 are pivotable relative to root arms 64, 66.

Wings 30, 32, including wing frames 40, 42, are moveable between a deployed, or extended, position shown in FIG. 1A, a stowed, or retracted, position shown in FIG. 1B and partially deployed positions therebetween. Wing frames 40, 42 are in the deployed position in the forward flight mode of FIG. 1A so that wing skins 44, 46 can provide lift for unmanned aerial system 10. Wing frames 40, 42 may be in the stowed position in the VTOL flight mode of FIG. 1B to reduce the horizontal movement of unmanned aerial system 10 caused by wind gusts and generally enhance aerodynamics in VTOL flight mode. Wing frames 40, 42 may also be in the stowed position in a storage mode of unmanned aerial system 10. When in the stowed position, extension arms 68, 70 pivot relative to root arms 64, 66 so that wing frames 40, 42 may more closely retract against fuselage 12, as seen in FIG. 1B, thereby reducing the footprint, wingspan and aerodynamic lift area of unmanned aerial system 10. While the embodiments shown in FIGS. 1A-1B fold wings 30, 32 to a position adjacent to an exterior of fuselage 12, in other embodiments a slot, channel or other receptacle may be provided on fuselage 12 to allow at least a portion of wing skins 44, 46, root arms 64, 66 and/or extension arms 68, 70 to be received within fuselage 12. Wing frames 40, 42 transition between the deployed and stowed positions when unmanned aerial system 10 transitions between forward flight mode and VTOL flight mode. In some embodiments, wing frames 40, 42 may extend into the deployed position just prior to unmanned aerial system 10 transitioning from VTOL flight mode to forward flight mode.

Foldable wing system 38 includes a wing actuator 72 disposed in fuselage 12 to move wing frames 40, 42 between the deployed and stowed positions. Wing actuator 72 may be a hydraulic, pneumatic or electromechanical actuator, such as a hydraulic, pneumatic or electromechanical servo, or servomechanism. Wing actuator 72 is coupled to a linkage point 74 on right inboard gear 50 via a linkage 76. In other embodiments, wing actuator 72 may be coupled to a linkage point located on left inboard gear 48. Wing actuator 72 may also be coupled to other portions of either wing frame 40, 42, such as one of root arms 64, 66 or one of extension arms 68, 70. Left inboard gear 48 is meshed, or otherwise engaged, with right inboard gear 50 such that wing frames 40, 42 move symmetrically between the deployed position of FIG. 1A and the stowed position of FIG. 1B in response to movement of linkage point 74 by wing actuator 72. In the illustrated embodiments, wing actuator 72 rotates linkage point 74 on right inboard gear 50 about pivot post 58, which rotates both left and right inboard gears 48, 50 and wing frames 40, 42 of which they are a part. Previous attempts to fold wings have used actuator systems to independent deploy and retract each wing. It has been found, however, that these system may fail to move the wings equally resulting in asymmetric wing deployment and/or stowing. In the present embodiments, wing frames 40, 42 are coupled together to impart rotation on one another via meshed inboard gears 48, 50 such that both wing frames 40, 42 move together assuring symmetric deployment and stowing of the wings. In addition, the present embodiments enable wing deployment and stowing using a single wing actuator 72 connected to only one of wing frames 40 or 42.

In some embodiments, biasing mechanisms such as torsion springs may be utilized to rotationally bias wing frames 40, 42 in a deployed position or a stowed position. In other embodiments, the elasticity of wing skins 44, 46 may bias wing frames 40, 42 toward the stowed position. In embodiments employing such biasing mechanisms, an engaged brake or lock may be released to stow or deploy wing frames 40, 42. A selectively engaged brake, lock or rigid linkage configuration may also prevent unwanted retraction of wings 30, 32 from the deployed position. In yet other embodiments, the distal ends of extension arms 68, 70 may be pulled toward the rear of fuselage 12 using a rotatable spool of string, cable, elastic cord or other connective link.

In some embodiments, wing skins 44, 46 may be formed from any suitable flexible material that is relatively lightweight, bendable, stretchable or otherwise well-suited for serving as a stowable, foldable or crushable skin of wings 30, 32. For example, wing skins 44, 46 may be formed from latex and/or natural rubber. Wing skins 44, 46 may be configured to allow repeated bunching, folding or bending so as to allow deployment and stowing of wings 30, 32 without substantially compromising the material of wing skins 44, 46. In some embodiments, wing skins 44, 46 may be formed as a sack-like structure that receives the root arms 64, 66 and extension arms 68, 70 of wing frames 40, 42. In other embodiments, wing skins 44, 46 may be formed from a single layer of material. Root arms 64, 66 may form leading profiles that generally serve to form the shapes of the leading edges of wings 30, 32. The leading profiles of root arms 64, 66 may be covered by wing skins 44, 46. In other embodiments in which wing skins 44, 46 are formed from a single layer of material, wing skins 44, 46 may be attached to the trailing profiles of root arms 64, 66. In such embodiments, wing skins 44, 46 may similarly be attached to the inner profiles of extension arms 68, 70 rather than wrapping around the outer profiles of extension arms 68, 70. Regardless of the shape or structure of wing skins 44, 46, wing skins 44, 46 may be attached to and/or tethered at appropriate locations along fuselage 12, root arms 64, 66 and/or extension arms 68, 70 so that upon full deployment of wings 30, 32, a predetermined aerodynamic surface is provided to enhance a lifting force on unmanned aerial system 10 while unmanned aerial system 10 is in forward flight mode.

By controlling the tilting of either or both rotors 16, 18, independently controlling the rotational speeds of rotors 16, 18, controlling foldable wings 30, 32 and controlling tail assembly 28, unmanned aerial system 10 can maneuver and fly in a variety of positions and scenarios. For example, unmanned aerial system 10 may be used in a wide variety of military missions including data collection, imaging, reconnaissance, weapon deployment or other missions. By way of non-limiting example, unmanned aerial system 10 may be used to deploy a grenade or other explosive in a hard-to-reach area, such as a cave. Unmanned aerial system 10 may also be scalable to any size from miniature drone implementations to manned implementations. For example, unmanned aerial system 10 may be implemented as a micro unmanned aerial system, mini VTOL vehicle, handheld unmanned aerial system or hobbyist aircraft for recreational use. In other embodiments, unmanned aerial system 10 may be one of a multitude of deployable swarm unmanned aerial systems capable of intercommunication and coordinated missions. Foldable wings 30, 32 allow unmanned aerial system 10 to be easily storable and deployable for ease of transport when not in use.

It should be appreciated that unmanned aerial system 10 is merely illustrative of a variety of aircraft that can implement the embodiments disclosed herein. Indeed, foldable wing system 38 may be utilized on any winged aircraft. Other aircraft implementations can include tiltrotor aircraft, hybrid aircraft, compound aircraft, tiltwing aircraft, quad tiltrotor aircraft, propeller airplanes, manned or piloted aircraft and the like. The geared interface of foldable wing system 38 may also be adapted to deploy and stow the rotor blades of rotorcraft. As such, those skilled in the art will recognize that foldable wing system 38 disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2:
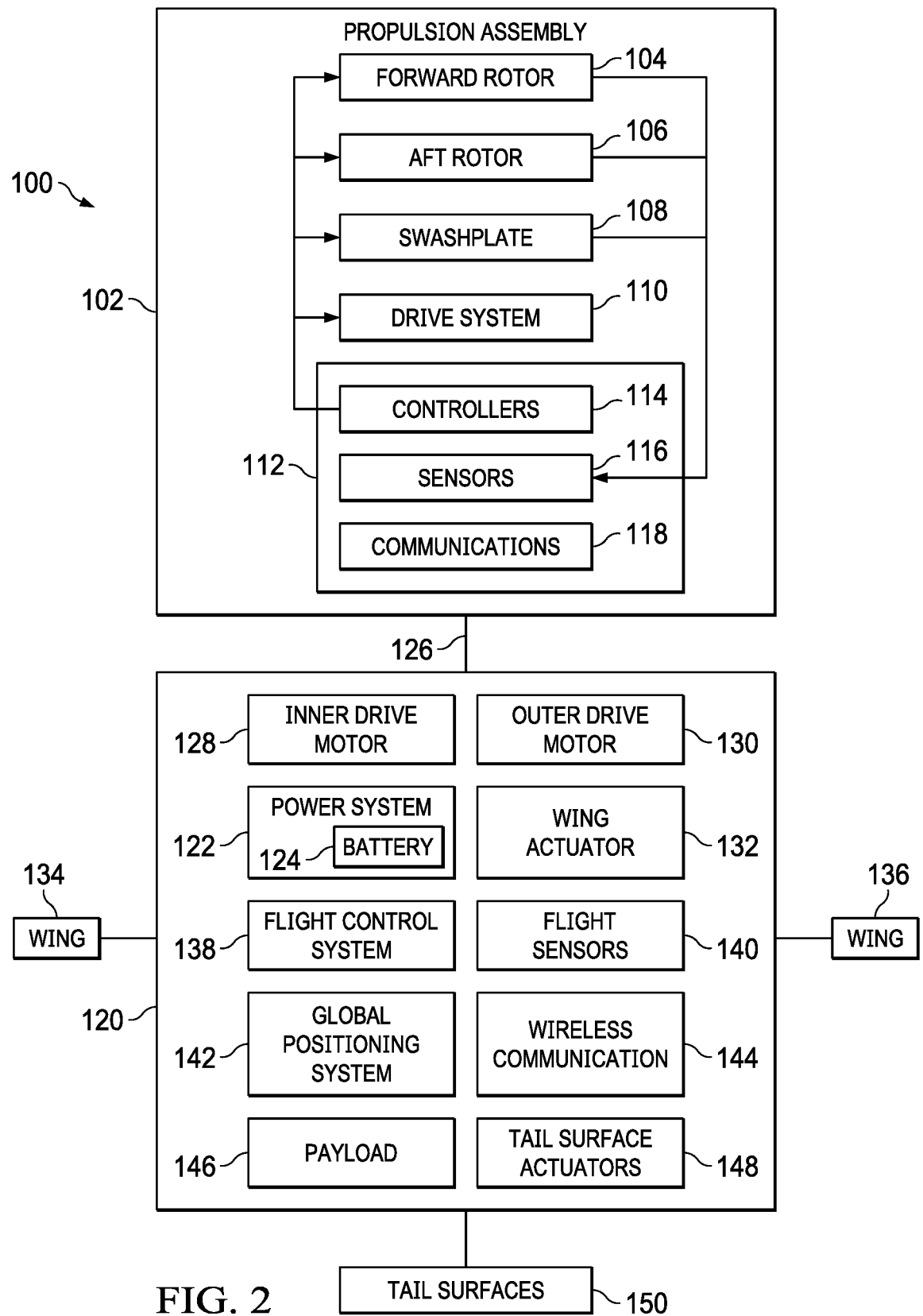
FIG. 2 is a block diagram of a propulsion and control system for an unmanned aerial system having a foldable wing system in accordance with embodiments of the present disclosure.

Referring to FIG. 2 in the drawings, a propulsion and control system for an unmanned aerial system is schematically illustrated and generally designated 100. Propulsion assembly 102 includes a forward rotor 104, an aft rotor 106, a swashplate 108 to tilt either or both rotors 104, 106, a drive system 110 and an electronics node 112 including, for example, controllers 114, sensors 116 and communications elements 118, as well as other components suitable for use in the operation of propulsion assembly 102. Rotors 104, 106 are coaxial and counter rotating. Each rotor 104, 106 includes a plurality of rotor blades radiating therefrom. The rotor blades of rotors 104, 106 may be fixed or variable pitch rotor blades.

Fuselage 120 includes a power system 122 that may serve as the electrical energy source for propulsion assembly 102 and other systems and components of unmanned aerial system 100. Power system 122 may include one or more batteries 124. Battery 124 may be charged by an electrical energy generation system (not shown), such as an internal combustion engine, or may be charged at a ground station. Battery 124 may also be interchangeably removed and installed to enable efficient refueling which may be particularly beneficial in embodiments of unmanned aerial system 100 wherein the sole electrical energy source is battery 124. In embodiments that include an electrical energy generation system, such as an internal combustion engine, housed within fuselage 120, the electrical energy generation system may include one or more fuel tanks, such as liquid fuel tanks. In one non-limiting example, an internal combustion engine may be used to drive an electric generator that produces electrical energy to power propulsion assembly 102 via communication line 126. In other embodiments, unmanned aerial system 100 may implement a hybrid power system including both an internal combustion engine and batteries. This type of hybrid power system may be beneficial in that the energy density of liquid fuel exceeds that of batteries enabling greater endurance for unmanned aerial system 100. In the hybrid power system, battery 124 may provide a backup electrical power source to enable unmanned aerial system 100 to safely land in the event of a failure of the internal combustion engine. In yet other embodiments, propulsion assembly 102 may include a battery to provide backup battery power in the event of a failure of power system 122. As another alternative, propulsion assembly 102 may include hydraulic motors operated within a common hydraulic fluid system wherein one or more high pressure hydraulic sources or generators are housed within fuselage 120 to provide power to each of the hydraulic motors. In yet other embodiments, battery 124 may be replaced or supplemented with other sources of electricity such as capacitors, photovoltaic solar cells, fuel cells or any other system or component configurable to provide electrical energy to components of unmanned aerial system 100.

Inner and outer drive motors 128, 130 may be powered by power system 122 and each selectively provide rotational power to a respective one of rotors 104, 106. Wing actuator 132, such as wing actuator 72 in FIGS. 1A-1B, moves wings 134, 136 between deployed and stowed positions as described in the illustrative embodiments. Wings 134, 136 each include a wing frame and have a geared interface therebetween. Unmanned aerial system 100 includes a flight control system 138 housed within fuselage 120 to manage the overall operation of unmanned aerial system 100. Flight control system 138, such as a digital flight control system, is preferably a redundant flight control system and more preferably a triply redundant flight control system including three independent flight control computers. Use of triply redundant flight control system 138 improves the overall safety and reliability of unmanned aerial system 100 in the event of a failure of flight control system 138. Flight control system 138 preferably includes non-transitory computer readable storage media including a set of computer instructions executable by one or more processors for controlling the operation of propulsion assembly 102. Flight control system 138 may be implemented on one or more general purpose computers, special purpose computers or other machines with memory or processing capability. For example, flight control system 138 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 138 may be a microprocessor-based system operable to execute program code in the form of machine executable instructions. In addition, flight control system 138 may be selectively connectable to other computer systems via a proprietary encrypted network, a public encrypted network, the Internet or other suitable communication network that may include both wired and wireless connections.

Flight control system 138 communicates via a wired and/or wireless communications network with electronics node 112 of propulsion assembly 102. In some embodiments, electronics node 112 may instead be centralized into fuselage 120. Flight control system 138 is configured to receive inputs from flight sensors 140 such as, but not limited to, gyroscopes, accelerometers or any other suitable sensing equipment configured to provide flight control system 138 with spatial, positional or force dynamics information, feedback or other data that may be utilized to manage the operation of unmanned aerial system 100. For example, flight control system 138 may use sensor data from flight sensors 140 to generate and send flight command information to electronics node 112 to control propulsion assembly 102. Unmanned aerial system 100 may include global positioning system 142 configured to determine, receive and/or provide data related to the location of unmanned aerial system 100 including flight destinations, targets, no-fly zones, preplanned routes, flight paths or any other geospatial location related information. Global positioning system 142 may be configured for bidirectional communication with flight control system 138, unidirectional communication from global positioning system 142 to flight control system 138 or unidirectional communication from flight control system 138 to global positioning system 142.

Unmanned aerial system 100 may include wireless communication components 144 such as radio communication equipment configured to send and receive signals related to flight commands or other operational information. Wireless communication components 144 may be configured to transmit video, audio or other data gathered, observed or otherwise generated, carried by or obtained by unmanned aerial system 100. In some embodiments, flight control system 138 may also be operable to communicate with one or more remote systems via wireless communication components 144 using a wireless communications protocol. The remote systems may be operable to receive flight data from and provide commands to flight control system 138 to enable flight control over some or all aspects of flight operation. In alternative embodiments, unmanned aerial system 100 may instead be a manned or piloted vehicle. For both manned and unmanned missions, flight control system 138 may autonomously control some or all aspects of flight operation. For example, transitions between VTOL flight mode and forward flight mode may be accomplished responsive to remote flight control, autonomous flight control, onboard pilot flight control or combinations thereof.

Payload 146 of unmanned aerial system 100 may include a video camera, thermal camera, infrared imaging device, high definition camera, weapon, chemical sensor or any other suitable payload. Payload 146 may be configured to provide data to flight control system 138 and flight control system 138 may be configured to control or manipulate payload 146. In some embodiments, payload 146 may protrude from the aft end of fuselage 120. Tail surface actuators 148 may be operatively mounted within fuselage 120 and configured to selectively actuate tail surfaces 150 of a tail assembly.

Figure 3:
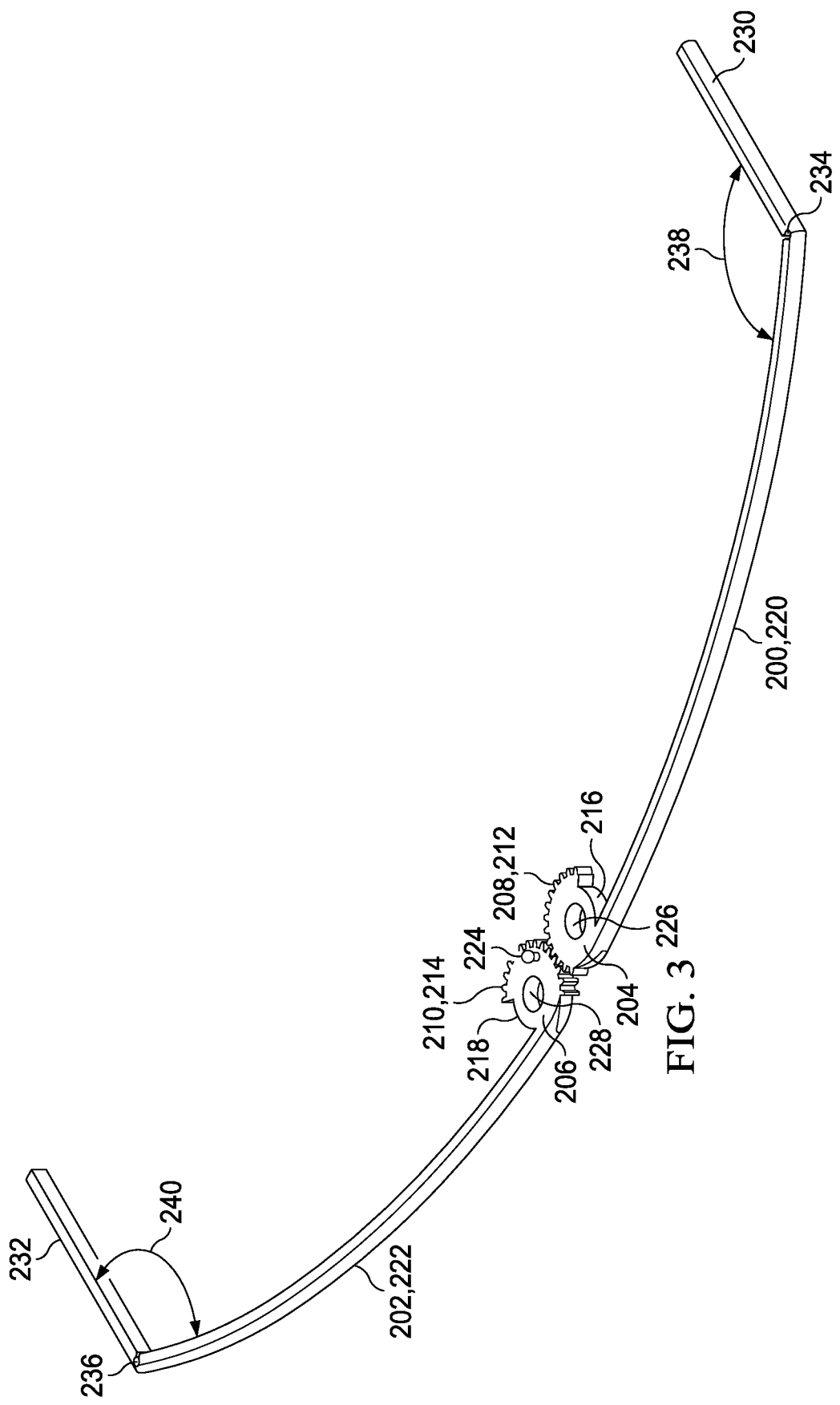
FIG. 3 is an isometric view of wing frames for an unmanned aerial system in accordance with embodiments of the present disclosure.

Referring to FIG. 3 in the drawings, left and right wing frames 200, 202 of an unmanned aerial system are schematically illustrated. Inboard gears 204, 206 of wing frames 200, 202 are partial gears in that teeth 208, 210 encircle a partial circumference of each inboard gear 204, 206, respectively. Teeth 208, 210 are disposed on geared portions 212, 214 of inboard gears 204, 206. Inboard gears 204, 206 also include smooth portions 216, 218 from which root arms 220, 222 protrude. Although in the illustrated embodiment, geared portions 212, 214 encircle about half of each inboard gear 204, 206, in other embodiments geared portions 212, 214 may encircle a larger or lesser circumference of each inboard gear 204, 206, respectively. The top face of right inboard gear 206 includes a linkage ball 224, such as a servo linkage ball, to which a linkage, such as linkage 76 in FIGS. 1A-1B, may be coupled to provide an operable connection to a wing actuator, such as wing actuator 72 in FIGS. 1A-1B. Either inboard gear 204 or 206 may include linkage ball 224. Inboard gears 204, 206 form pivot post apertures 226, 228 through which pivot posts and/or bearings may be disposed.

Extension arms 230, 232 may be pivotable, or rotatable, relative to root arms 220, 222 at hinges 234, 236. In the illustrated embodiment, hinges 234, 236 form slits that facilitate the rotational movement of extension arms 230, 232 relative to root arms 220, 222. In other embodiments, extension arms 230, 232 may be rotatably coupled to root arms 220, 222 using pins and/or torsion springs that rotationally bias extension arms 230, 232 into the position shown in FIG. 3. Hinges 234, 236 permit wing frames 200, 202 to be pulled closer to the fuselage of the unmanned aerial system in the stowed position as shown in FIG. 1B. In the deployed position shown in FIG. 3, extension arms 230, 232 form obtuse inner angles 238, 240 with root arms 220, 222, although in other embodiments extension arms 230, 232 may form acute, straight or reflex angles with root arms 220, 222 in the deployed position, respectively. Wing frames 200, 202 may be formed from any material capable of supporting wing skins in all positions during flight such as plastic, composite, fiberglass or metallic materials. Wing frames 200, 202 may have a hollow or solid longitudinal core.

Figure 4A:
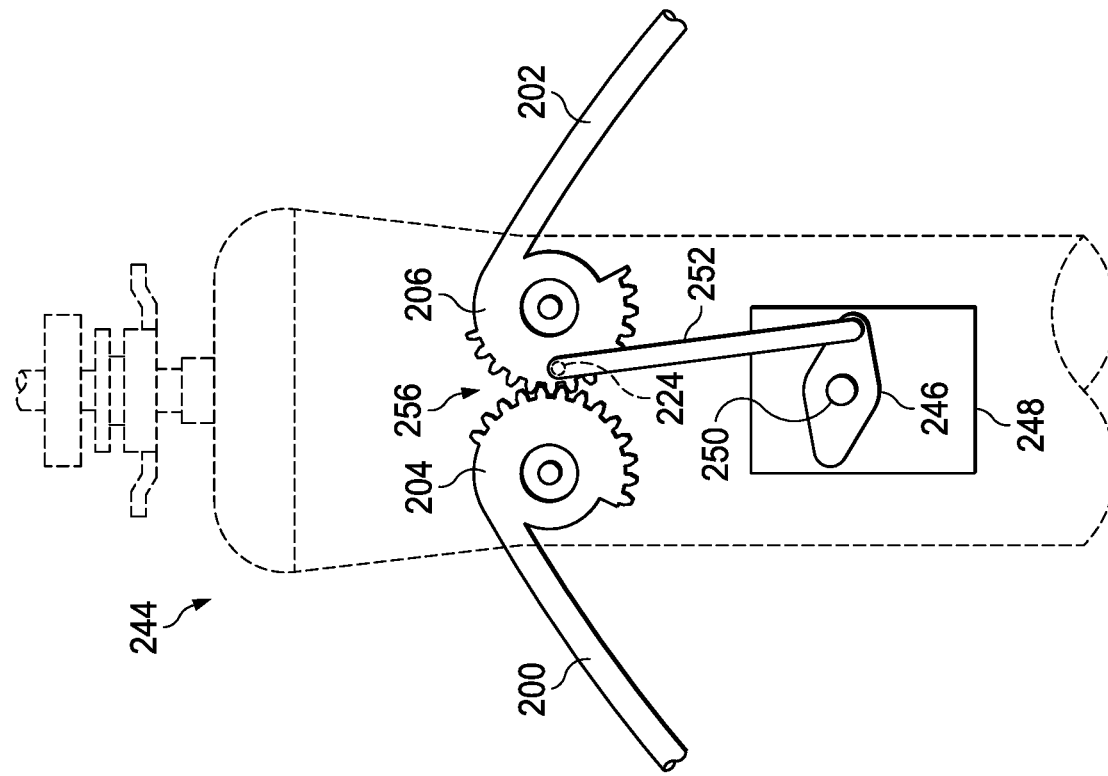
FIGS. 4A-4D are top views of an unmanned aerial system having wing frames transitioning from a deployed position to a stowed position in accordance with embodiments of the present disclosure.
Figure 4B:
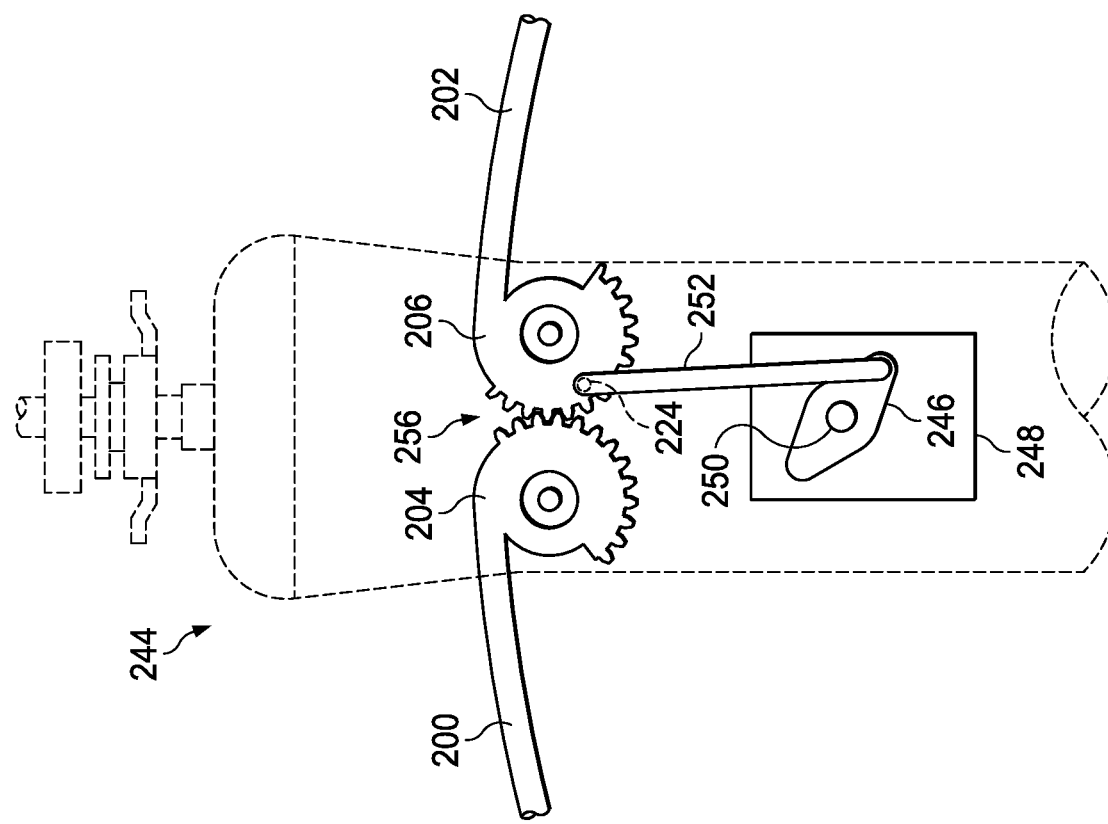
Figure 4C:
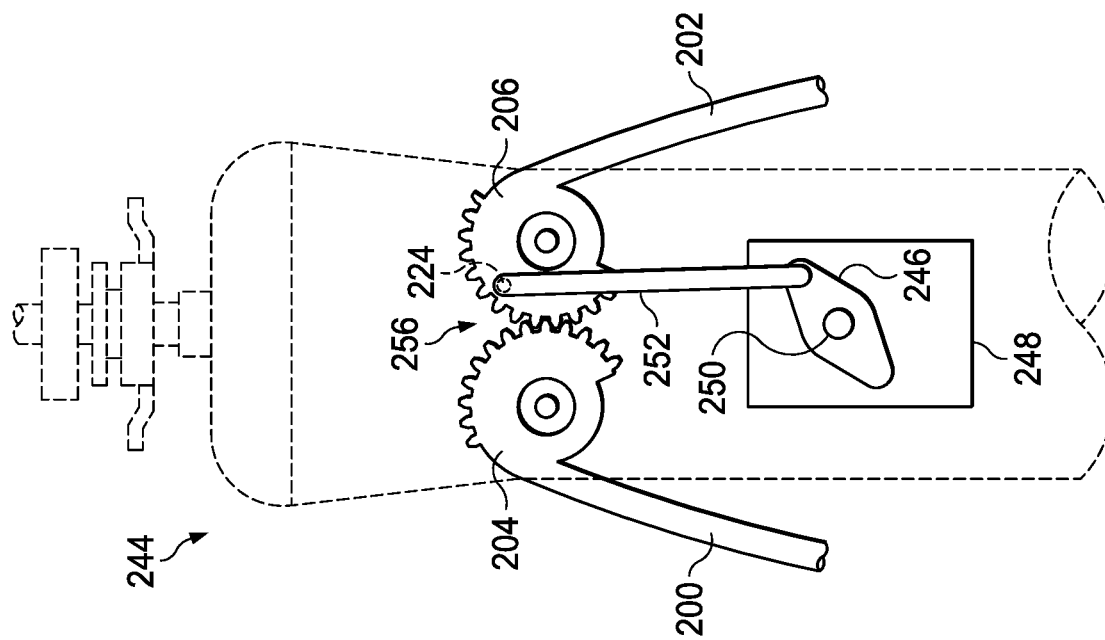
Figure 4D:
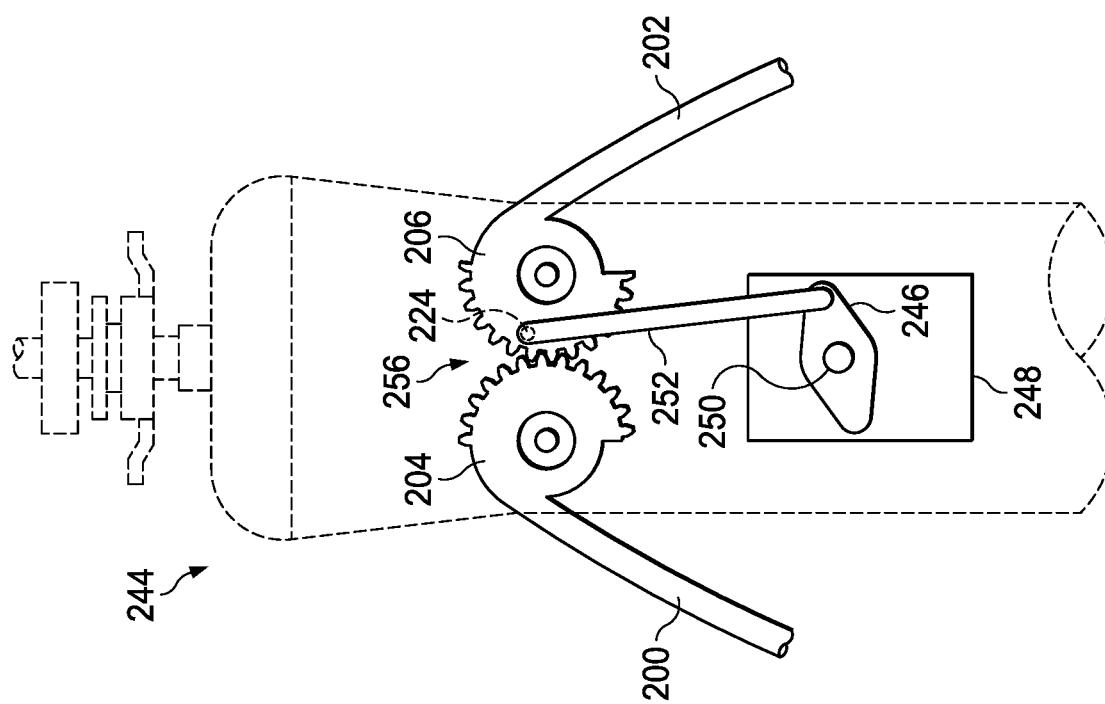

Referring to FIGS. 4A-4D in the drawings, an operation of stowing wing frames 200, 202 of unmanned aerial system 244 is sequentially depicted. In FIG. 4A, wing frames 200, 202 are in the deployed, extended position. Servo arm 246, rotatably coupled to servo 248 via hinge post 250 is rotated fully clockwise to pull linkage 252 aftward, which pulls right inboard gear 206 counter clockwise via linkage ball 224. Geared interface 256 between inboard gears 204, 206 causes both wing frames 200, 202 to be symmetrically deployed outward in response to the rotation of only one of inboard gears 204, 206. In FIGS. 4B-4C, wing frames 200, 202 are partially deployed as they move toward the stowed position. Servo arm 246 rotates counter clockwise to move linkage 252 in the forward direction, which causes the clockwise rotation of linkage ball 224 and right inboard gear 206. The meshing of inboard gears 204, 206 at geared interface 256 causes left inboard gear 204 to rotate counter clockwise in response to the clockwise rotation of right inboard gear 206, thereby moving wing frames 200, 202 into the stowed position shown in FIG. 4D. In the stowed position of FIG. 4D, servo arm 246 is rotated fully counter clockwise to push linkage 252 forward, which rotates right inboard gear 206 clockwise via linkage ball 224. From the stowed position, wing frames 200, 202 may be extended into the deployed position of FIG. 4A using an opposite sequence as that shown in FIGS. 4A through 4D. The relative motions of servo arm 246, linkage 252 and inboard gears 204, 206 may differ from that described in the illustrated embodiment. For example, the components of the foldable wing system may instead be arranged such that wing frames 200, 202 are stowed by the clockwise rotation of servo arm 246, aftward motion of linkage 252 and/or counter clockwise rotation of right inboard gear 206. Linkage 252 may alternatively be coupled to left inboard gear 204 instead of right inboard gear 206. Geared interface 256 allows a single actuator or servo to control the position of both wing frames 200, 202 using a linkage point to a single one of inboard gears 204, 206.

Referring to FIGS. 5A-5H in the drawings, a sequential takeoff, flight and landing scenario of unmanned aerial system 244 is depicted. In FIG. 5A, unmanned aerial system 244 is in a storage mode prior to deployment. Wing frames 200, 202 are in the stowed position. In storage mode unmanned aerial system 244 may be more easily stored during transport or in tight spaces. For example, unmanned aerial system 244 may be stored and subsequently launched from a munitions dispenser in a military engagement. Unmanned aerial system 244 may also be tossed into the air by a machine or person, after which the rotors of propulsion assembly 260 begin to rotate. In another operational example, unmanned aerial system 244 can be initially stored in a small box, backpack or sack with wing frames 200, 202 in the stowed position. Once unmanned aerial system 244 is removed from storage, a desired configuration of initial operation can be selected, namely, forward flight mode or VTOL flight mode. In some cases, a mode of operation in between forward flight mode and VTOL flight mode can be selected as an initial operation. When an initial mode of operation in VTOL flight mode is desired, propulsion assembly 260 may be activated to lift unmanned aerial system 244 in a substantially vertical orientation as shown in FIG. 5B. After taking off in VTOL flight mode, servo 248 deploys wing frames 200, 202 as unmanned aerial system 244 transitions to forward flight mode as shown in FIG. 5C. With wing frames 200, 202 partially deployed, the rotors of propulsion assembly 260 and tail assembly 262 may be used to transition unmanned aerial system 244 into the forward flight mode shown in FIGS. 5D and 5E. In other embodiments, servo 248 may deploy wing frames 200, 202 while unmanned aerial system 244 is still in the VTOL flight mode of FIG. 5B, just before transitioning to forward flight mode.

In FIGS. 5D and 5E, unmanned aerial system 244 is in forward flight mode and has a substantially horizontal orientation. Wing frames 200, 202 are in the deployed position. The rotors of propulsion assembly 260 and tail assembly 262 may be operated as necessary to maintain forward flight and the horizontal orientation of unmanned aerial system 244. To land unmanned aerial system 244, propulsion assembly 260 and tail assembly 262 may be operated to flare unmanned aerial system 244 as shown in FIG. 5F to slow the forward motion of unmanned aerial system 244. Servo 248 may then stow wing frames 200, 202 as unmanned aerial system 244 transitions into the VTOL flight mode shown in FIG. 5G. In other embodiments, unmanned aerial system 244 may omit transitioning into VTOL flight mode and instead land while in forward flight mode. In the illustrated embodiment, once unmanned aerial system 244 transitions into VTOL flight mode as shown in FIG. 5G, unmanned aerial system 244 may land on a surface 264 as shown in FIG. 5H while wing frames 200, 202 are stowed. It is noted that unmanned aerial system 244 could alternatively takeoff and/or land while wing frames 200, 202 are deployed.

In one non-limiting operational example, unmanned aerial system 244 may be launched from a first location in VTOL flight mode, convert midair to forward flight mode, fly to a new location (in some cases at least partially guided by a global positioning system) and subsequently transition back to VTOL flight mode at the new location. While at the new location, unmanned aerial system 244 may utilize onboard equipment, such as cameras to conduct surveillance and transmit information regarding the surveillance using wireless communication components. After conducting the surveillance or otherwise completing a mission at the new location, unmanned aerial system 244 may once again convert to forward flight mode and selectively return to the site of the launch or any other desired location. In other embodiments of operation methodology, unmanned aerial system 244 may be launched in forward flight mode and selectively switch between modes of operation as desired or necessary. One non-limiting example of a preprogrammed switch from forward flight mode to VTOL flight mode may be in response to flight sensors providing feedback to unmanned aerial system 244 regarding gusts of wind, heavy rainfall or other environmental flight encumbrances that are determined to prevent successful, safe or efficient flight between locations. In response to undesirable flight conditions, unmanned aerial system 244 may convert to VTOL flight mode and automatically land itself upright on tail assembly 262 as shown in FIG. 5H. When flying conditions detected by the flight sensors become favorable again, unmanned aerial system 244 may launch itself in VTOL flight mode and again convert to forward flight mode to continue travelling to a desired location.

Figure 6:
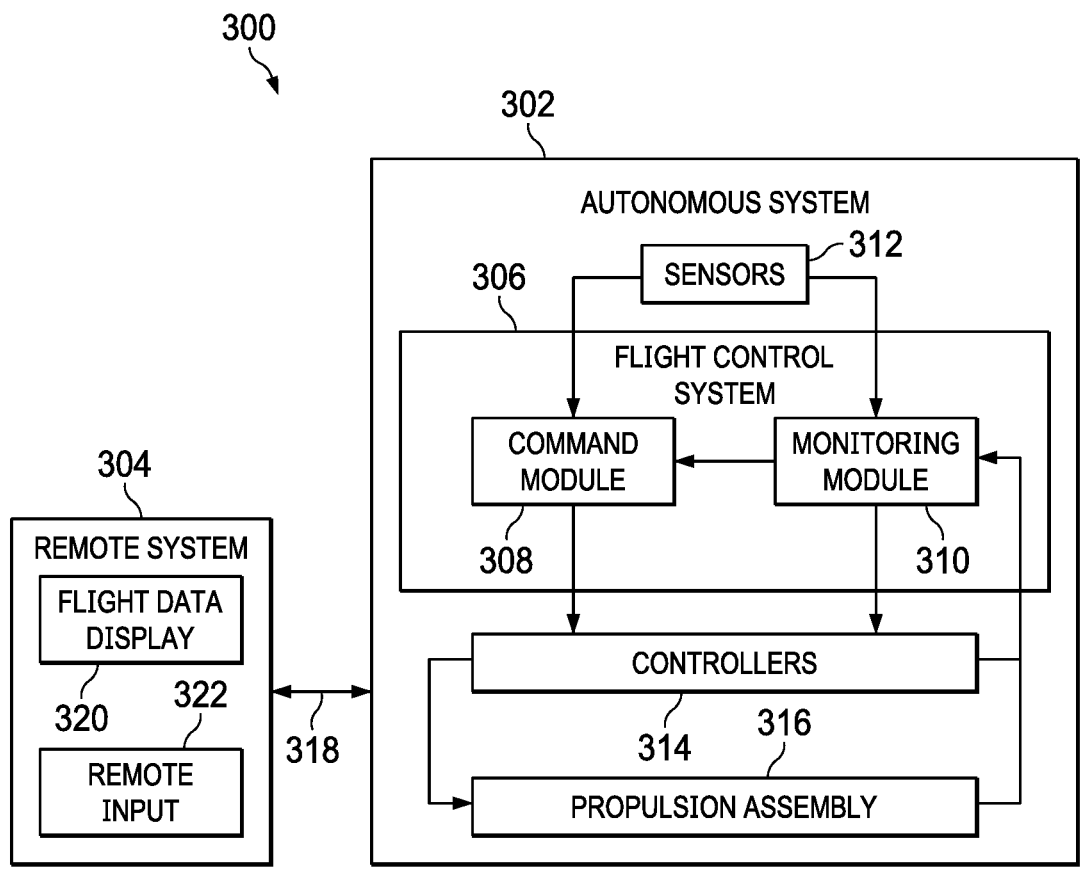
FIG. 6 is a block diagram of a control system for an unmanned aerial system having a foldable wing system in accordance with embodiments of the present disclosure.

Referring to FIG. 6 in the drawings, a block diagram depicts a control system 300 operable for use with an unmanned aerial system, such as unmanned aerial system 10, of the present disclosure. In the illustrated embodiment, control system 300 includes two primary computer-based subsystems, namely, an autonomous system 302 and a remote system 304. As discussed herein, the unmanned aerial system of the present disclosure may be operated autonomously responsive to commands generated by flight control system 306 that preferably includes a non-transitory computer readable storage medium including a set of computer instructions executable by a processor. Flight control system 306 may be a triply redundant system implemented on one or more general purpose computers, special purpose computers or other machines with memory and processing capability. For example, flight control system 306 may include one or more memory storage modules including, but not limited to, internal storage memory such as random access memory, non-volatile memory such as read only memory, removable memory such as magnetic storage memory, optical storage, solid-state storage memory or other suitable memory storage entity. Flight control system 306 may be a microprocessor-based system operable to execute program code in the form of machine executable instructions. In addition, flight control system 306 may be selectively connectable to other computer systems via a proprietary encrypted network, a public encrypted network, the Internet or other suitable communication network that may include both wired and wireless connections.

In the illustrated embodiment, flight control system 306 includes a command module 308 and a monitoring module 310. It is to be understood by those skilled in the art that these and other modules executed by flight control system 306 may be implemented in a variety of forms including hardware, software, firmware, special purpose processors and combinations thereof. Flight control system 306 receives input from a variety of sources including internal sources such as sensors 312, controllers 314 and propulsion assembly 316 as well as external sources such as remote system 304, global positioning system satellites or other location positioning systems and the like. For example, flight control system 306 may receive a flight plan including starting and ending locations for a mission from remote system 304. Thereafter, flight control system 306 is operable to autonomously control all aspects of flight of the unmanned aerial system, including moving the wings of the unmanned aerial system between the deployed and stowed positions. Indeed, autonomous system 302 is capable of performing any programmed mission.

In one example, during the various operating modes of the unmanned aerial system including VTOL flight mode, forward flight mode and transitions therebetween, command module 308 provides commands to controllers 314. These commands enable operation of propulsion assembly 316 including, for example, controlling the rotational speed of the rotors, changing the pitch of the rotor blades, adjusting thrust vectors and the like. In addition, these commands enable transition of the unmanned aerial system between a vertical lift orientation and a forward thrust orientation. Commands from command module 308 also enable movement of the wings between the deployed and stowed positions. Flight control system 306 receives feedback from controllers 314 and propulsion assembly 316. This feedback is processed by monitoring module 310 that can supply correction data and other information to command module 308 and/or controllers 314. Sensors 312 such as positioning sensors, attitude sensors, speed sensors, torque sensors, environmental sensors, fuel sensors, battery level sensors, temperature sensors, wing deployment sensors, location sensors and the like also provide information to flight control system 306 to further enhance autonomous control capabilities.

Some or all of the autonomous control capability of flight control system 306 can be augmented or supplanted by remote flight control system 304. Remote system 304 may include one or more computing systems that may be implemented on general purpose computers, special purpose computers or other machines with memory and processing capability. For example, the computing systems may include one or more memory storage modules including, but not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet or any other type of network that couples a plurality of computers to enable various modes of communication via network messages using suitable communication techniques, such as transmission control protocol/internet protocol, file transfer protocol, hypertext transfer protocol, internet protocol, security protocol, point-to-point tunneling protocol, secure sockets layer protocol or other suitable protocol. Remote system 304 communicates with flight control system 306 via a communication link 318 that may include both wired and wireless connections.

Remote system 304 preferably includes one or more flight data display devices 320 configured to display information relating to one or more aerial vehicles of the present disclosure. Display device 320 may be configured in any suitable form, including, for example, liquid crystal displays, light-emitting diode displays, cathode ray tube displays or any suitable type of display. Remote system 304 may also include audio output and input devices such as a microphone, speakers and/or audio port allowing an operator to communicate with, for example, other personnel involved with the operation of the unmanned aerial system. Display device 320 may also serve as a remote input device 322 if a touchscreen display implementation is used, however, other remote input devices, such as a keyboard or joysticks, may alternatively be used to allow an operator to provide control commands to the unmanned aerial system being operated responsive to remote control. While control system 300 is intended for an unmanned aerial system, in some embodiments control system 300 may include a pilot system (not shown) that allows a pilot onboard the aircraft to interact with remote system 304 and/or autonomous system 302 to pilot the aircraft. As should be apparent to those having ordinary skill in the art, through the use of control system 300, an unmanned aerial system of the present disclosure can be operated responsive to a flight control protocol including autonomous flight control, remote flight control and combinations thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A foldable wing system for an unmanned aerial system including a fuselage, the foldable wing system comprising:
   a left wing frame having a root arm, an extension arm and an inboard gear rotatably coupled to the fuselage;
   a right wing frame having a root arm, an extension arm and an inboard gear rotatably coupled to the fuselage; and
   a wing actuator coupled to a linkage point on at least one of the wing frames;

wherein, the wing frames are movable between a plurality of positions including a deployed position and a stowed position; and wherein, the inboard gear of the left wing frame is engaged with the inboard gear of the right wing frame such that the wing frames move symmetrically between the plurality of positions in response to movement of the linkage point by the wing actuator.

2. The foldable wing system as recited in claim 1 wherein the wing frames each have an inboard end and wherein the inboard gears are formed at the inboard ends of the wing frames.

3. The foldable wing system as recited in claim 1 wherein the inboard gears are meshed such that rotation of one of the left wing frame or the right wing frame causes rotation in the other of the left wing frame or the right wing frame.

4. The foldable wing system as recited in claim 1 wherein the extension arm forms an obtuse inner angle with the root arm.

5. The foldable wing system as recited in claim 1 wherein the extension arm is pivotable relative to the root arm.

6. The foldable wing system as recited in claim 1 further comprising a left wing skin coupled to the left wing frame to form a left wing and a right wing skin coupled to the right wing frame to form a right wing.

7. The foldable wing system as recited in claim 1 further comprising left and right wing pivot posts coupled to the fuselage, the inboard gears each rotatably coupled to a respective one of the wing pivot posts to form a revolute joint.

8. The foldable wing system as recited in claim 1 wherein the inboard gears each further comprise a partial gear having teeth disposed around a partial circumference of the inboard gear.

9. The foldable wing system as recited in claim 1 wherein the wing actuator further comprises a servo disposed in the fuselage.

10. The foldable wing system as recited in claim 1 wherein the linkage point is located on one of the inboard gears and the wing frames move between the plurality of positions in response to the wing actuator rotating the linkage point.

11. The foldable wing system as recited in claim 10 wherein the wing frames transition to the stowed position in response to one of a clockwise or a counter clockwise rotation of the linkage point by the wing actuator and the wing frames transition to the deployed position in response to the other of the clockwise or the counter clockwise rotation of the linkage point by the wing actuator.

12. The foldable wing system as recited in claim 1 wherein the linkage point further comprises a linkage ball disposed on one of the inboard gears.

13. The foldable wing system as recited in claim 1 further comprising a linkage coupling the wing actuator to the linkage point.

14. The foldable wing system as recited in claim 13 wherein the wing frames move into the stowed position in response to the wing actuator moving the linkage forward and the deployed position in response to the wing actuator moving the linkage aft.

15. A rotorcraft comprising:

a fuselage;

a left wing frame having a root arm, an extension arm and an inboard gear rotatably coupled to the fuselage;

a right wing frame having a root arm, an extension arm and an inboard gear rotatably coupled to the fuselage; and a wing actuator coupled to a linkage point on at least one of the wing frames;

wherein, the wing frames are movable between a plurality of positions including a deployed position and a stowed position; and wherein, the inboard gear of the left wing frame is engaged with the inboard gear of the right wing frame such that the wing frames move symmetrically between the plurality of positions in response to movement of the linkage point by the wing actuator.

16. The rotorcraft as recited in claim 15 wherein the rotorcraft is operable to transition between a vertical takeoff and landing flight mode and a forward flight mode, the fuselage having a vertical orientation in the vertical takeoff and landing flight mode and a horizontal orientation in the forward flight mode.

17. The rotorcraft as recited in claim 16 wherein the wing frames are in the deployed position in the forward flight mode.

18. The rotorcraft as recited in claim 16 wherein the wing frames transition between the stowed position and the deployed position in response to transitioning between the vertical takeoff and landing flight mode and the forward flight mode.

19. The rotorcraft as recited in claim 16 wherein the wing frames are positionable into the stowed position in the vertical takeoff and landing flight mode.

* * * * *